(12) United States Patent
Kassel et al.

(10) Patent No.: US 6,575,664 B1
(45) Date of Patent: Jun. 10, 2003

(54) SEALING ARRANGEMENT

(75) Inventors: Dieter Kassel, Rönnenberg (DE); Werner Degel, Buchholz (DE); Holger Gutschmidt, Neu Wulmstorf (DE)

(73) Assignee: Phoenix AG, Hamburg (DE)

( * ) Notice: Subject to any disclaimer, the term of this patent is extended or adjusted under 35 U.S.C. 154(b) by 101 days.

(21) Appl. No.: 09/831,713

(22) PCT Filed: Sep. 5, 2000

(86) PCT No.: PCT/DE00/03033

§ 371 (c)(1),
(2), (4) Date: May 14, 2001

(87) PCT Pub. No.: WO01/20130

PCT Pub. Date: Mar. 22, 2001

(30) Foreign Application Priority Data

Sep. 14, 1999 (DE) .......................................... 199 44 068

(51) Int. Cl.$^7$ ............................................... E21D 11/00
(52) U.S. Cl. .................. 405/152; 405/135; 277/644; 277/645; 277/650; 52/393; 52/396.04
(58) Field of Search ................. 405/152, 135; 277/644, 645, 650, 921, 944; 52/396.06, 396.04, 393

(56) References Cited

U.S. PATENT DOCUMENTS

| 4,041,665 A | * | 8/1977 | de Munck ................ 52/396.02 |
| 4,130,213 A | * | 12/1978 | Wszolek ....................... 215/349 |
| 4,206,930 A | * | 6/1980 | Thrane et al. ............... 277/468 |
| 4,946,309 A | | 8/1990 | Glang |
| 5,172,919 A | * | 12/1992 | Takasaki et al. ............ 277/644 |
| 5,888,023 A | * | 3/1999 | Grabe et al. ................. 277/626 |
| 6,267,536 B1 | * | 7/2001 | Adachi et al. ............... 277/645 |
| 6,358,589 B1 | * | 3/2002 | Tsai et al. .................... 428/64.1 |
| 6,434,904 B1 | * | 8/2002 | Gutschmidt et al. .......... 52/393 |
| 2002/0164211 A1 | * | 11/2002 | Gutschmidt et al. ........ 405/152 |

FOREIGN PATENT DOCUMENTS

| DE | PCT WO 9821267 | * | 5/1998 | ............... C08J/3/00 |
| DE | PCT WO 9902820 | * | 1/1999 | ........... E21D/11/38 |
| EP | 0 011 919 | | 7/1982 | |
| EP | 0 306 581 | | 8/1993 | |
| EP | 0 553 723 | | 8/1993 | |
| EP | 0 449 082 | | 10/1993 | |
| EP | 0 631 034 | | 12/1994 | |
| EP | 0 633 413 | | 1/1995 | |
| EP | 0 574 559 | | 5/1997 | |
| EP | 0 807 204 | | 4/1999 | |
| WO | 96 27073 | | 9/1996 | |

\* cited by examiner

Primary Examiner—J. J. Swann
Assistant Examiner—Katherine W. Mitchell
(74) Attorney, Agent, or Firm—Collard & Roe, P.C.

(57) ABSTRACT

A sealing arrangement which comprises at least two abutting components that form a gap therebetween and a seal that sealingly bridges the gap. The inventive sealing arrangement is characterized in that the seal entirely consists of a matrix or is provided with a matrix representing a composite system. The matrix is combined with a base body and is a pasty mixture comprising a water-soluble material. A lubricant and a swelling agent which can be activated by means of water as well as optionally additional additives are mixed into the material. In an advantageous embodiment, the matrix is introduced into the chamber. The wall of the chamber is configured in the form of a web that can be torn out. The web is removed before assembly. The base body consisting of an elastomeric material is provided with channels and grooves which extend in an extruded-like manner.

14 Claims, 2 Drawing Sheets

SEALING ARRANGEMENT

CROSS REFERENCE TO RELATED APPLICATIONS

Applicants claim priority under 35 U.S.C. §119 of German Application No. 199 44 068.9 filed Sep. 14, 1999. Applicants also claim priority under 35 U.S.C. §120 of PCT/DE00/03033 filed Sep. 5, 2000. The international application under PCT article 21(2) was not published in English.

The invention relates to a sealing arrangement comprising two abutting structural components made of concrete, reinforced concrete, cast iron or other materials (e.g. synthetic resin) forming a gap, as well as a seal bridging the gap in a sealing manner.

A sealing arrangement of said type is known from U.S. Pat. No. 4,946,309, whereby the abutting structural components are segments that are assembled to a tubular tunnel, specifically with the formation of transverse and longitudinal joints. Each segment is in this conjunction preferably provided with at least one recess extending all around and covering all abutting sides of the segment, whereby a sealing section made of elastomer material and extending in the form of a strand is present in each recess. Due to the compression of the abutting segments, whereby the gap is reduced, the sealing section then develops its sealing power due to the interaction between force and reactive force.

Furthermore, it is known from EP-B-0 807 204 to provide such sealing sections for the construction of tunnels with an additional emergency seal consisting of a sealing material than can be activated with water. The emergency seal is to be activated in this conjunction only when a critical situation occurs, for example with strong shifting of the segments.

In conjunction with tunnel segments, in particular with finishing stones, sealing sections made of elastomer material are frequently provided with a sliding layer that is located within the area of contact between the abutting sealing sections. According to EP-B-0 574 559, the sliding layer consists of a material that is harder than the actual body of the sectional seal. The drawback of said sealing concept is that the elasticity of the sealing section is influenced in an unfavorable manner.

As another example of the sealing arrangement of the type specified herein it is necessary to mention the sealing employed in conjunction with the sealing of pipes or shaft construction structures. The abutting structural components in this conjunction are the end of a bell, on the one hand, which comprises a bell base and a bell mirror, as well as the end of a spigot on the other, whereby a ring-shaped sealing section made of elastomer material bridges the gap of the bell-and-spigot joint in a sealing manner. Such a sealing concept is described, for example in EP-B-0 449 082.

In order to facilitate the assembly of the end of the bell and the end of the spigot, it is proposed in EP-B-0 011 919 to provide the sealing section within the contact side facing the spigot with a lubricant, in particular in connection with a sliding hose. In conjunction with such a conception, however, it was frequently necessary to put up with a reduction in the sealing efficiency.

Based on the state of the art described above, the problem of the invention consists in providing a sealing arrangement that is characterized by high sealing efficiency irrespective of the purpose of application of the sealing, and which facilitates the assembly of the structural components.

Said problem is solved by a sealing system in which the seal
  entirely consists of a matrix or
  is provided with a matrix representing a composite that is combined with a base body,
whereby
  the matrix is a pasty mixture comprising a water-soluble material into which a lubricant and a swelling agent that can be activated with water, as well as additional additives, if necessary, are admixed.

The mixture of the matrix preferably comprises the following proportions in terms of quantity (parts by weight):

| | |
|---|---|
| Water-soluble material | 50 to 150, in particular 80 to 120 |
| Lubricant | 20 to 100, in particular 40 to 70 |
| Swelling agent | 20 to 100, in particular 30 to 60 |
| Other additives | 0 to 150 |

Preferably a polyethylene glycol with a molecular weight of 200 to 1000 is used as the water-soluble material, whereby the viscosity can be adjusted depending on the molecular weight of the polyethylene glycol.

The lubricant is advantageously a graphite powder an/or a silicone oil.

Any material that can be swelled by water can be used as the swelling agent (e.g. hydrotite). Undesirable premature swelling is avoided by stirring the swelling agent into the polyethylene glycol.

The other additives may be dyestuffs, bright fillers, as well as thickening agents.

Other advantageous variations are introduced in connection with the description of the figures.

Now, the invention is explained in the following with the help of exemplified embodiments and by reference to schematic drawings, in which.

Figure 1:
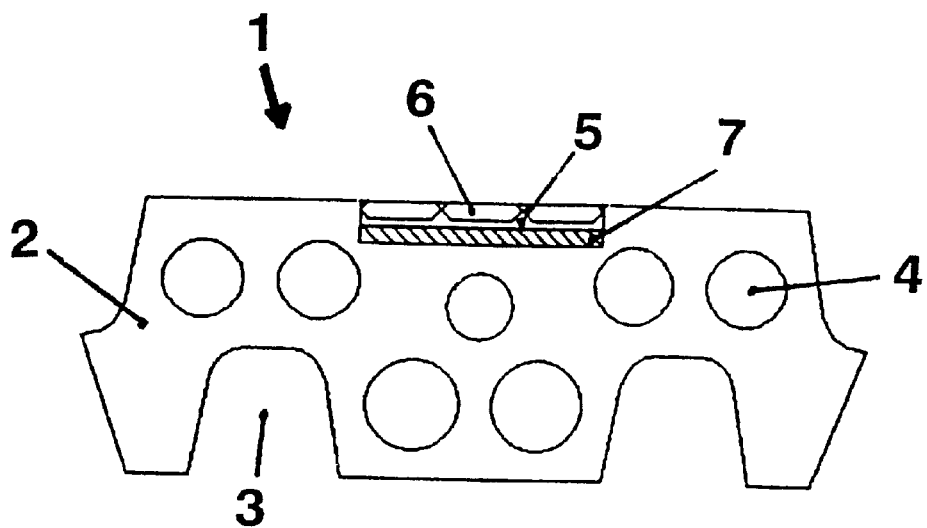
FIG. 1 shows a seal for tunnel construction, in connection with which the matrix is covered by a web that can be torn out.

The following list of reference symbols is applicable in association with the figures:

1, 1' Seal for tunnel construction
2, 2' Base body of the seal for tunnel construction
3 Groove
4 Channel
5 Chamber
6 Tear-out web
7, 7' Matrix
8 Groove
9 Foil
10, 10' Seal for canal construction
11, 11' Base body of seal for canal construction
12 Anchoring foot
13 Channel
14 Chamber
15 Tear-out web
16, 16' Matrix
17 Groove
18 Foil FIG. 1 shows a seal for tunnel construction. In this conjunction, the seal is a composite system comprising a base body 2 and a layer-shaped macrix 7; the thickness of the matrix layer is below the one of the base body. The base body 2 made of elastomer material is provided with two grooves 3, a total of seven channels 4, as well as with a chamber, the latter being located within the sliding zone of the base body. The thin wall of the chamber is formed by a tear-out web 6. The base body including the tear-out web is an extruded product with a uniform elastomer material. The matrix 7, which is first protected by the tear-out web 5 against external influences (e.g. during transport), is located within the chamber 5. Prior to the installation, i.e. before the segments (made, for example, of concrete) are assembled, the tear-out web is then removed, whereby the matrix can then fulfill its function.

Figure 2:
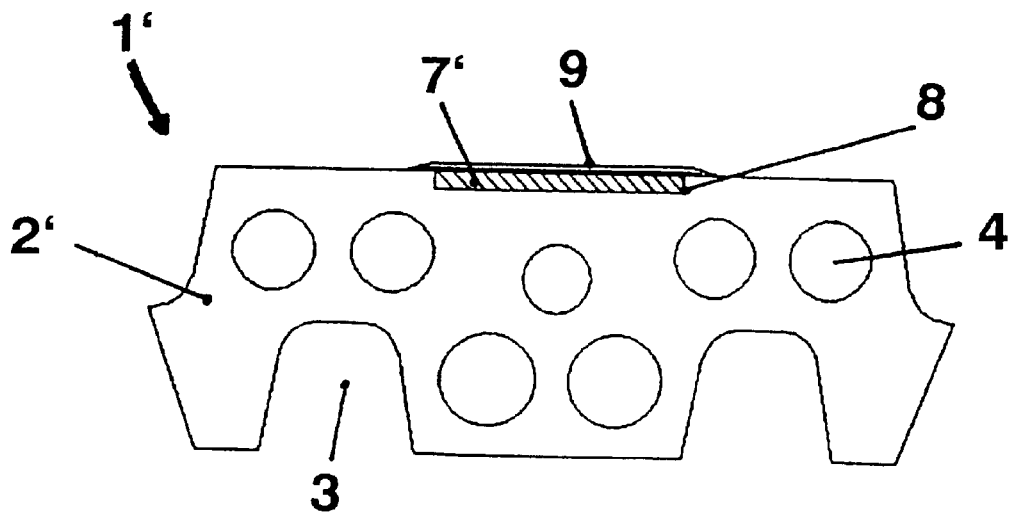
FIG. 2 shows a seal for tunnel construction in connection with which the matrix is covered by a foil.

FIG. 2 shows a modified seal 1' for tunnel construction. In the present case, the base body 2' is provided within its sliding zone with a groove 8, in which the matrix 7' is seated. The protective strip initially covering the matrix is a foil 9. Said foil is then removed as well prior to the installation.

Figure 3:
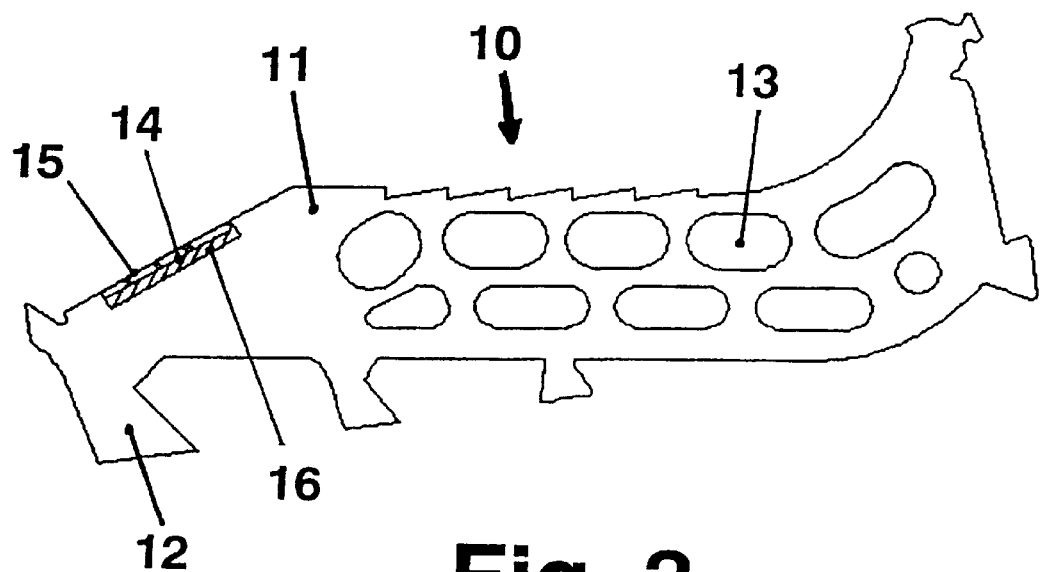
FIG. 3 shows a seal for tunnel construction in connection with which the matrix is covered by a web that can be torn out.

FIG. 3 shows a seal 10 for canal construction (for pipelines, shafts). The seal is a composite system in the present case as well, comprising a base body 11 and a layer-shaped matrix 16. The base body 11 is made of elastomer material and equipped with a plurality of anchoring feet 12, which are anchored within the end of the bell (e.g. made of concrete). Furthermore, the base body is provided with a plurality of the channels 13, which are arranged in two rows. Within its sliding zone, the base body has a chamber 14, whereby the thin chamber wall has the form of a tear-out web 15. The matrix 16 is located within the chamber 14. Prior to the installation, i.e. before the end of the bell and the end of the spigot are assembled, the tear-out web is removed in the present case as well.

Figure 4:
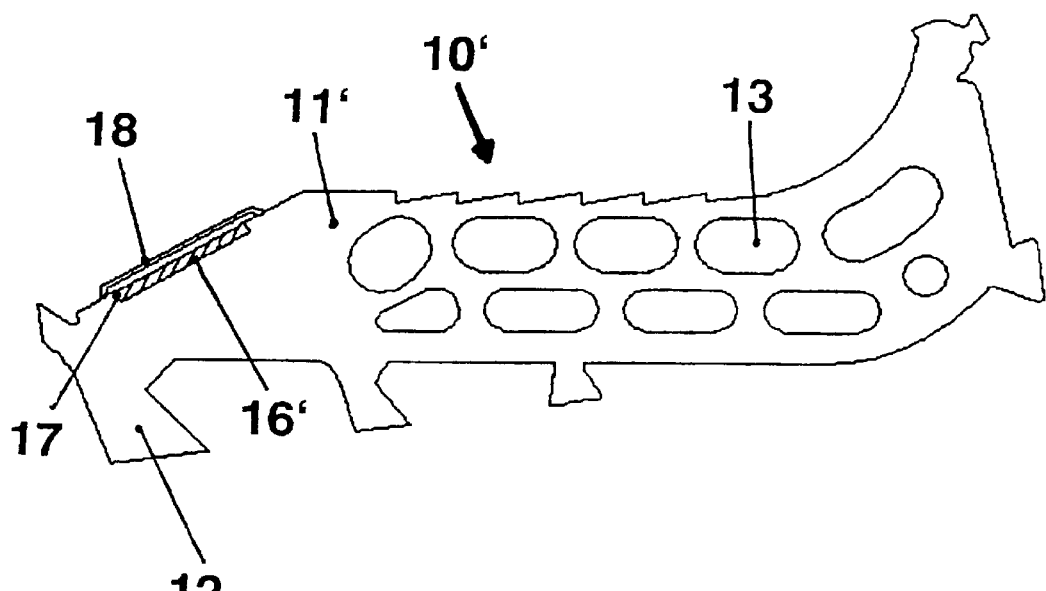
FIG. 4 shows a seal for canal construction in connection with which the matrix is covered by a foil.

FIG. 4 shows a slightly modified seal 10' for canal construction. The base body 11' is provided with a groove 17 within its sliding zone in the present case as well, and the matrix 16' is seated in said groove. The protective strip initially covering the matrix is a foil 18. Said foil is removed a swell prior to the installation.

The base body 2, 2' (FIGS. 1, 2) is produced by extrusion in most cases, whereby the matrix 7, 7', and 16, 16', respectively, is then installed in the chamber 5, 14, or groove 8, 17 later. This is combined with the protective effect of the tear-out web 6, 15, or the foil 9, 18, respectively.

In the absence of moisture it is possible also to co-extrude the base body and the matrix with application of the suitable processing technology.

What is claimed is:

1. A seal for a sealing arrangement which includes two abutting structural components having a gap, said seal comprising:
   a) at least one base body having at least one chamber wherein said at least one chamber has at least one surrounding chamber wall;
   b) at least one matrix including a pasty mixture of a water soluble material, a lubricant and a swelling agent disposed in said at least one chamber, and surrounded by said at least one surrounding chamber wall which is sufficiently thin for permitting said at least one surrounding chamber wall to be removed or destroyed during installation.

2. The seal as in claim 1, wherein said at least one matrix is composed of the following elements:

| | |
|---|---|
| water-soluble material | 50 to 150 parts by weight; |
| lubricant | 20 to 100 parts by weight; |
| swelling agent | 20 to 100 parts by weight; |
| other additives | 0 to 150 parts by weight. |

3. The seal as in claim 1, wherein said at least one matrix comprises the following elements:

| | |
|---|---|
| water-soluble material | 80 to 120 parts by wt; |
| Lubricant | 40 to 70 parts by wt; and |
| swelling agent | 30 to 60 parts by wt. |

4. The seal as in claim 3, wherein said water soluble material is polyethylene glycol.

5. The seal as in claim 3, wherein said polyethylene glycol has a molecular weight of between 200 and 1000.

6. The seal as in claim 1, wherein said lubricant is a graphite powder.

7. The seal as in claim 1, wherein said lubricant is a silicone oil.

8. The seal as in claim 1, wherein said at least one matrix is arranged in a sliding zone of said base body and is in a form of a layer.

9. The seal as in claim 8, wherein said at least one matrix has a lower thickness than said at least one base body.

10. The seal as in claim 1, further comprising at least one protective strip, wherein said at least one matrix is covered by said at least one protective strip, and wherein said at least one protective strip is removed prior to installation of the seal or destroyed in the course of installation.

11. The seal as in claim 1, wherein said at least one chamber is in a form of a groove which is located in a sliding zone of said at least one base body with said at least one matrix being seated in said groove.

12. The seal as in claim 1, wherein said at least on surrounding chamber wall is in a form of a tear out web.

13. The sealing arrangement as in claim 11, wherein said at least one base body is an extruded product made of elastomer material.

14. The sealing arrangement as in claim 13, wherein said at least one base body has a series of additional grooves extending as strands.

* * * * *